Patented Sept. 12, 1933

1,926,543

UNITED STATES PATENT OFFICE 1,926,543

PLASTIC COMPOSITION

James Keeth, Spokane, Wash.

No Drawing. Application July 18, 1931
Serial No. 551,800

1 Claim. (Cl. 106—35)

My present invention relates to an improved plaster composition and process of making the same. The plaster composition of my invention is of the argillaceous or clayey type, which is comparatively light in weight, and which possesses the qualities whereby it adheres closely and firmly to lath, brick or tile, concrete or cement surfaces, as well as to wood, plaster boards, and various other forms of building construction and materials that require plastering.

As is well known, the usual hard wall plaster sets quickly, and checks and cracks, especially at corners and turns, because of the lack of bonding qualities in the composition. A further objection to the usual plaster wall is its tendency to crack and check as the building structure or material to which the plaster is applied, settles, or shrinks.

The plaster composition of my invention is of such consistency and body that it will not check nor crack while drying, and the plaster expands and contracts with similar changes in the material to which it is applied. By applying the plaster of my invention to a building wall the latter is rendered soundproof, and provides a heat insulation that prevents transmission of heat, as well as of moisture.

My improved plaster may be trowelled on a wall to a smooth finish, and this finished wall may receive paint, oil, enamel, tints or stains, or the wall surfaces thus prepared may be covered with the usual wall paper &c.

In preparing my improved plaster I employ materials that are inexpensive in cost and readily obtainable, and I provide a wall plaster that is durable, light in weight but strong, and which in its plastic condition may with facility be trowelled upon the surface to be plastered.

In carrying out my invention I utilize the following ingredients in approximately the stated proportions, by weight:—

| | Parts |
|---|---|
| Clay | 6 |
| Paper pulp | 2 |
| Sawdust | 1 |

These ingredients are mixed with water to form a plaster of the proper plasticity or consistency, and while the above formula has produced a very satisfactory plaster, it will be understood that the proportions may be varied within limits, and I therefore do not confine myself to these exact porportions.

The clay employed may be of any suitable common variety and obtained from banks or pits in practically all parts of the country and as the clays vary in color, colored clays may be used with color effects where desired in the plaster, or if required, suitable coloring material or agents may be incorporated in the plaster during the process of making it, without changing the characteristics and values of the plaster composition.

Waste papers, originally made from wood pulp, or from other fibrous material, are used as a binder for the clay, and in addition this fibrous material adds strength and body to the plaster.

The sawdust, obtained as waste material from saw mills and from different kinds of wood, is incorporated as a filler for the finished composition, and in addition the sawdust provides an agency, during the process of preparing the composition, that renders the mixture more friable and suitable for carrying out one of the steps in the process of making the plaster composition.

In carrying out the steps in the process of making the plaster composition of my invention, the clay and saw dust are supplied to a hopper, which feeds these materials in proper proportions to a mixing machine, which also acts as a beater, and which contains water in required quantity for the mixing operation, and during this operation the clay and sawdust are ground or mixed together and closely commingled.

The fibrous material, in the form of stock, sheets, and other forms of waste paper is also incorporated and mixed with the clay and saw dust in the mixing machine, and the fibrous material, of course is fed to the mixer in proper proportions with relation to the other ingredients of the composition.

The mixing machine may be in the nature of a beating machine, which reduces the paper sheets or paper stock to fine fibers, and at the same time thoroughly incorporates the clay, sawdust and fibrous paper pulp into a mass of finely comminuted materials. Thus the three ingredients, in water, are reduced, beaten, and thoroughly commingled to form a plaster pulp or plastic composition, and at suitable intervals the mass is run or flowed from the mixing machine into a suitable receptacle.

By means of a pump, or in other suitable manner, the watery pulp is next conveyed to a grinding apparatus, which may comprise burr-stones between which the mixture is ground to reduce the commingled parts to an extreme fineness, and to thoroughly and uniformly incorporate the ingredients into a moist mass.

This moist mass, of which the solids have been finely comminuted, is next conveyed to a dehydrating apparatus or press, in which the major portion of the moisture is extracted and drained off, and the water content is materially reduced, leaving a stiff, plastic substantially homogeneous composition, in which the clay, sawdust filler and fibrous binder are uniformly distributed and adhesively incorporated, and which is friable.

To prepare the plastic composition for shipping, storing, and commercial purposes, the composition is broken up or crumbled into fine homogeneous particles in the nature of a fibrous powder, and the presence of the sawdust filler in the mixture insures that the composition will break up in this manner thereby permitting easy handling of the composition.

For breaking up and crumbling the composition it is passed through a suitable grinding machine wherein the composition is broken up into small particles in the nature of a fibrous powder that is soft and smooth to the touch, and which is porous and absorbent, and readily handled for packing in bags or sacks for storing and shipping purposes.

When the composition is to be used as a plaster, the fibrous powdery material or composition is placed in a suitable receptacle and water in required quantities is added thereto, agitated or stirred and thoroughly mixed to form the plastic composition or plaster of proper consistency, and this plastic composition may readily be trowelled on a wall surface, or applied by other suitable tools or implements to the wall.

The plastic composition quickly and securely keys or bonds itself to the wall surface, and because of its toughness and strength a comparatively thin layer of the plastic composition may be employed, and as the composition is light in weight a minimum load is imposed on the wall structure to which the composition is applied. Thus the plaster may be applied in a comparatively thin coat on any of the usual wall-boards, or to a plastered wall of usual structure, to render such structures sound-proof. After the composition has dried and set its surface is comparatively soft and yielding to the touch, but the body of the coating is tough, firm and durable, and the material is capable of expansion and contraction so that it may "come and go" with changes in the structure to which it is applied.

Because of the fibrous binder in the composition, the plastered wall is free from cracks or crumbling, and the surface of the plastered wall is dustless.

As before stated, the face of the plastered wall may be finished or smoothed for a finished exposure, or the surface may be ornamented by painting, tinting, staining &c., or if desired, the surface may be covered with wall paper in the usual manner. In any event, the range of expansion and contraction of the composition is such that the plastered wall will adapt itself to all conditions of this character inherent in the foundation to which the plaster is applied, and therefore checking, cracking, and crumbling are eliminated.

The composition is especially valuable for use in theatres, and other public places because of its acoustic properties, and it may readily be applied as a coating for the usual plastered walls to improve their acoustic properties.

Having thus fully described my invention, what I claim as new and desire to secure by Letters Patent is:

The process of preparing a plastic composition which consists in mixing clay, sawdust and fibrous paper in water, finely grinding the mixture in water, extracting the water from the mixture, pulverizing the dehydrated mixture, and adding water to bring the pulverized composition to a proper degree of plasticity for use.

JAMES KEETH.